Figure 1:
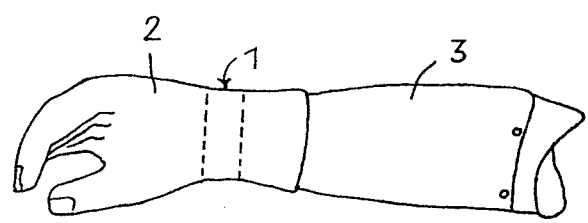

United States Patent [19]
Horvath

[11] 3,900,900
[45] Aug. 26, 1975

[54] DEVICE FOR DETACHABLY CONNECTING AN IMPLEMENT TO A SHAFT OF AN ARM PROSTHESIS AND JOINT COMPRISING SAID DEVICE

[75] Inventor: Eduard Horvath, Vienna, Austria

[73] Assignee: Otto Bock Orthopädische Industrie KG, Duderstadt, Germany

[22] Filed: Mar. 12, 1974

[21] Appl. No.: 450,453

[30] Foreign Application Priority Data
Mar. 16, 1973 Austria .............................. 2388/73

[52] U.S. Cl. ............................ 3/12.4; 3/12.8; 3/21
[51] Int. Cl.² ........................ A61F 1/06; A61F 1/04
[58] Field of Search ................... 3/12–12.8, 3/1.1, 21

[56] References Cited
UNITED STATES PATENTS
2,669,727  2/1954  Opuszenski ......................... 3/12.7

FOREIGN PATENTS OR APPLICATIONS
155,917  12/1920  United Kingdom ..................... 3/21

Primary Examiner—Ronald L. Frinks
Attorney, Agent, or Firm—Karl F. Ross; Herbert Dubno

[57] ABSTRACT

A sleeve having an internal annular raceway is adapted to be connected to one of the parts consisting of an implement and a shaft of an arm prosthesis. A cage is adapted to be connected to the other of said parts. An annular array of rolling elements is retained in and guided by said cage, the elements being substantially radially movable therein into and out of engagement with said raceway. A shifting mechanism is provided for moving said rolling elements into and out of engagement with said raceway.

14 Claims, 2 Drawing Figures

PATENTED AUG 26 1975  3,900,900

DEVICE FOR DETACHABLY CONNECTING AN IMPLEMENT TO A SHAFT OF AN ARM PROSTHESIS AND JOINT COMPRISING SAID DEVICE

This invention relates to a device for detachably connecting an implement, such as an artificial hand, to a shaft of an arm prosthesis.

Such connecting devices are required to enable a simple and quick coupling and uncoupling of the two parts which are to be connected or disconnected. The connection should be such that the implement can be rotated on the shaft, suitably by an electric motor, and should withstand in all positions of use the high stresses which arise.

According to the invention these requirements are fulfilled to a particularly high degree by an apparatus which is of the kind defined first hereinbefore and werein a sleeve is carried by one of the parts to be connected and is provided on the inside with a raceway, which is preferably formed by two wire rings and engageable by an annular series of rolling elements, particularly balls, which are carried by the other of the parts to be connected. The rolling elements are guided by a cage and carried by the other part and by a shifting mechanism are movable in a substantially radial direction into and out of engagement with the raceway.

The crux of the invention resides in that the rolling elements of a rolling element bearing, which permits of a rotational movement of the two connected parts, are also used as locking elements for disconnecting and connecting these two parts. For instance, when the balls carried by one part are in engagement with the raceway on the other part, then the connection will be established while a rotation is permitted. A shifting mechanism is provided to lock the balls in that position. When the adjusting mechanism has released the balls, they will disengage from the raceway so that the two parts may be separated from each other.

Figure 2:
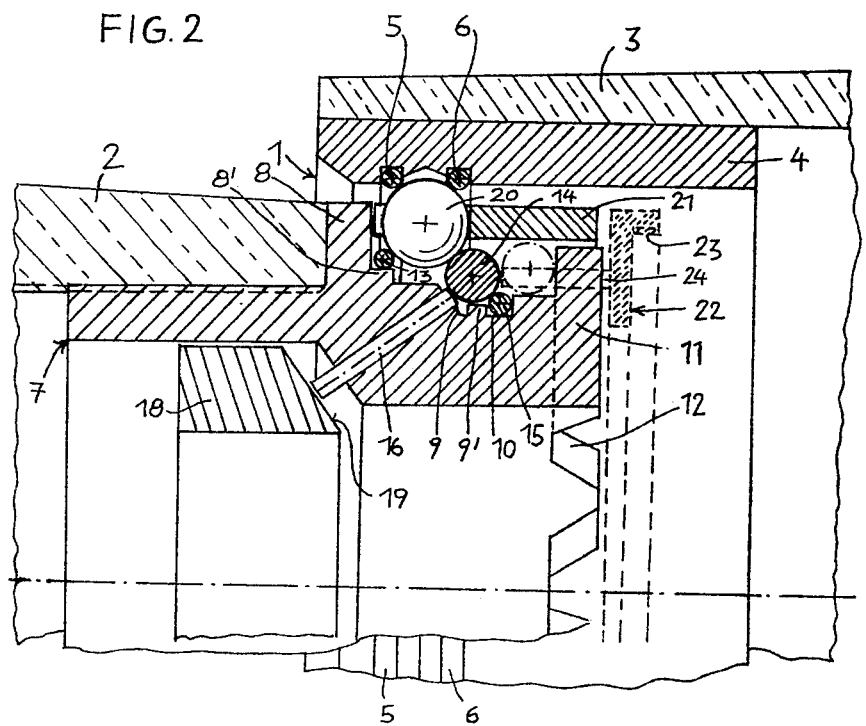

Further features and advantages of the invention will become apparent from the following description of a preferred embodiment with reference to the accompanying drawing, in which FIG. 1 is a side elevation showing the overall arrangement and FIG. 2 is a vertical sectional view showing the coupling device.

As is apparent from FIG. 1, the device 1 serves to detachably locate an implement, such as an artificial hand 2, on the shaft 3 of an arm prosthesis.

As is specifically apparent from FIG. 2, one part of the device 1 consists of a sleeve 4, which is secured to the shaft 3 and is circular in cross-section. On its inside, the sleeve 4 is provided near its free end with a raceway for balls, which consists of two spring steel wire rings 5, 6, which are axially spaced apart and held in grooves in the inside surface of the sleeve. The ends of the wire rings 5, 6 abut.

The other part of the apparatus 1 consists of a ring 7, which is secured to the artificial hand 2 and has an external flange 8. Two milled grooves 9 and 10 are formed in that wall portion of the ring 7 which adjoins the flange 8. On the left in FIG. 2, the groove 9 is defined by a side flank which is bevelled at an angle of about 45°. The ring 7 is provided at its free end with an end flange 11, which is spaced from the groove 10 and which is approximately rectangular in section. The flange 11 is not peripherally continuous but has a plurality of recesses or notches 12, which consist of radially tapered grooves, which are trapezoidal in section so that the end flange consists of claws which have a similar shape in section.

Three spring-steel wire rings are arranged in that wall portion of the ring 7 which is disposed between the flanges 8 and 11 and comprise a first ring 13 bearing on a step 8' and engaging the flange 8, a second ring 14, which in the position shown in solid lines in FIG. 2 bears on a rib 9' between the grooves 9 and 10, and a third ring 15, which is disposed in the groove 10 and closely juxtaposed to the ring 14. All these rings 13, 14 and 15 consist of stainless spring steel and have abutting ends. It is apparent that the rings 13 and 15 have approximately the same dimension in diameter and that the ring 14 is much larger in diameter than the rings 13 and 15 and at least twice as large.

A plurality of pins, e.g., six pins 16, are spaced around the periphery of the ring 14 and form a locking mechanism for the ring 14. The pins are arranged in bores of the ring 7 and their longitudinal axes include an angle of about 30° with the annular axis of the ring 7. The outwardly extending ends of the pins terminate at the bevelled side of the groove 10. The other ends of the pins 16 protrude into the interior of the ring 7, in which an annular drive member 18 is axially adjustable. The drive member 18 has a bevelled end face 19, which can act on the associated ends of the pins 16, so that the latter are axially displaced in an outward direction when the drive member 18 is axially displaced to the right in FIG. 2 by parts not shown in detail.

In the device described, bearing and coupling elements which permit of a rotational motion consist of balls 20, which are held in a cage 21 consisting, e.g., of plastic materials, in pockets which are open toward the flange 8 of the ring 7. The cage 21 is substantially as large in diameter as the external flange 8 and terminates approximately in line with the end flange 11 of the ring 7.

When the device is in the position shown in solid lines in FIG. 2 so that the parts 2 and 3 are connected, the balls 20 bear from the inside on the rings 5, 6 in the sleeve and from the outside of the rings 13 and 14. In that position the artificial hand 2 can rotate in the sleeve 4 relative to the prosthesis shaft 3, either in response to an external force acting on a frictional joint in the artificial hand 2 or under the action of an electric motor, which is accommodated in the shaft 3.

The shaft 3 contains in the usual manner an electric motor (not shown) for driving the artificial hand 2. This motor drives a wheel 22, which acts as a restoring member for the shifting mechanism and which is shown in dotted lines in FIG. 2. The wheel 22 may consist of plastic material and is connected to the motor, e.g., by a ring gear 23 and a speed-reducing gearing, not shown. At its end face confronting the ring 7, the wheel 22 has a series of axial projections 24, which serve to engage the recesses 12 in the end flange 11 and thus to transmit the rotational movement to the ring 7 and the artificial hand 2.

The arrangement of the rings and ball is such that the annular axes of the rings 14 and 15 and the centers of the balls 20 lie on the surface of a cone which has a vertex disposed on the axis of the rings. The annular axis of the ring 5 may also lie on the surface of said cone if this is desired.

This device has the following mode of operation:

When the device is in the position shown in FIG. 2 and the artificial hand 2 is to be removed from the shaft 3, the drive member 18 is axially displaced in the ring 7 to the right in FIG. 2 by means not shown in detail. As a result, the ends of the pins 16 move along the end face 19 so that the pins 16 are displaced outwardly to engage the ring 14 and deform the same by radially expanding it and at the same time shift the ring 14 axially to the right in FIG. 2. In other words, the cam and locking ring 14 moves over the ring 15, which lies in the groove 10 and provides a bearing during this movement, until the ring 14 has moved past the ring 15 and then bears under its inherent spring stress on the confronting side face of the end flange 11. This position of the ring 14 is shown in dash-dot lines in FIG. 2.

Because the inward movement of the balls 20 is no longer blocked, they can now move along the ring 13 against that wall portion of the ring 7 which is formed with the step 8' and the groove 9. As a result, the balls 20 disengage the rings 5 and 6 of the sleeve 4 so that the artificial hand 2 can be axially withdrawn from the shaft 3.

When the hand 2 or another implement provided with the device according to the invention is to be fitted, the projections 24 of the wheel 22 first extend through the recesses 12 in the end flange 11 of the wheel 7 until the end walls of these extensions bear on the radially expanded ring 14 in the position shown in dash-dot lines in FIG. 2. As the axially inward movement of the wheel 22 is continued, the projections 24 of the wheel 22 move the ring 14 over the ring 15 toward its original position shown in solid lines in FIG. 2 and the ring 14 snaps under its own spring stress into said position. At the same time the balls 20 are moved outwardly to their locking position in engagement with the rings 5, 6 of the sleeve 4 and the pins 16 as well as the drive member 18 are restored to their original positions.

It will be understood that the two parts to be connected or disconnected can be connected or separated by an axial displacement of said parts.

Numerous modifications of the embodiment described by way of example are possible in the scope of the invention. Specifically, it will make no difference whether the raceway 5, 6 for the balls 20 is provided on the sleeve 4, as described, or on the artificial hand 2. The shifting mechanism for the balls may be designed as desired. Specifically, the ring 7 may consist of two juxtaposed parts, which can be axially separated to release the balls from their locking position. Instead of balls, the rolling elements may consist of cylindrial rollers, tapered rollers or the like. The prostheses mounted on the sleeve may have any desired size in diameter so that one and the same connecting device may be used for all dimensions used in practice.

What is claimed is:

1. A separable joint for rotatably connecting a first member to a second member in an arm prosthesis assembly, said joint comprising:
    a sleeve mounted on one of said members;
    a seat mounted on the other of said members and receivable in said sleeve, said sleeve being formed with an internal annular raceway opening in the direction of said seat;
    a cage surrounding said seat within said sleeve and provided with a plurality of roller elements radially shiftable in said cage into and out of engagement with said raceway and rolling therein while being axially retained by said sleeve when radially received in said raceway;
    a camming ring axially shiftable on said seat toward and away from said elements and biasing said elements into said raceway in one axial position of said ring and permitting said elements to radially withdraw from said raceway in another axial position of said ring; and
    a shifting mechanism on said seat for axial displacing said ring from one of said positions into another of said positions.

2. The joint defined in claim 1 wherein said sleeve is provided with a pair of inwardly open annular grooves and a pair of wire rings received in said grooves and forming said raceway.

3. The joint defined in claim 2 wherein each of said wire rings has abutting ends.

4. The joint defined in claim 1 wherein said roller elements are balls.

5. The joint defined in claim 1 wherein said seat is provided with a second ring engageable by said camming ring in said one position of said camming ring for retaining said elements in said raceway.

6. The joint defined in claim 1 wherein said mechanism is so constructed and arranged as to spread said camming ring simultaneously with its displacement from said one position into said other position.

7. A separable joint for rotatably connecting a first member to a second member in an arm prothesis assembly, said joint comprising:
    a sleeve mounted on one of said members;
    a seat mounted on the other of said members and receivable in said sleeve, said sleeve being formed with an internal annular raceway opening in the direction of said seat;
    a cage surrounding said seat within said sleeve and provided with a plurality of roller elements radially shiftable in said cage into and out of engagement with said raceway and rolling therein while being axially retained by said sleeve when radially received in said raceway;
    a camming ring axially shiftable on said seat toward and away from said elements and biasing said elements into said raceway in one axial position of said ring and permitting said elements to radially withdraw from said raceway in another axial position of said ring;
    a shifting mechanism on said seat for axial displacing said ring from one of said positions into another of said positions; and
    a second ring mounted on said seat and of a diameter smaller than that of said camming ring, said camming ring being nearer to an axial inner end of said seat than said second ring.

8. A separable joint for rotatably connecting a first member to a second member in an arm prosthesis assembly, said joint comprising:
    a sleeve mounted on one of said members;
    a seat mounted on the other of said members and receivable in said sleeve, said sleeve being formed with an internal annular raceway opening in the direction of said seat;
    a cage surrounding said seat within said sleeve and provided with a plurality of roller elements radially shiftable in said cage into and out of engagement with said raceway and rolling therein while being axially retained by said sleeve when radially received in said raceway;

a camming ring axially shiftable on said seat toward and away from said elements and biasing said elements into said raceway in one axial position of said ring and permitting said elements to radially withdraw from said raceway in another axial position of said ring; and a shifting mechanism on said seat for axial displacing said ring from one of said positions into another of said positions, said shifting mechanism including means for expanding said ring radially simultaneously with the axial displacement thereof.

9. The joint defined in claim 8 wherein said mechanism comprises a plurality of spaced-apart pins slidably mounted in said seat and bearing upon said ring, said pins being inclined to the axis of said seat, drive means for displacing said pins against said ring to axially shift said ring and radially expand the same, and means for displacing said pins in the opposite direction.

10. The joint defined in claim 9 wherein said drive means includes a drive member having a bevelled face engageable with inner ends of said pins.

11. The joint defined in claim 9 wherein said seat has an end flange provided with apertures and said means for moving said pins in the opposite direction includes a wheel having axially extending projections passing through said apertures and engaging said ring.

12. The joint defined in claim 8 wherein said elements are balls in a circumferential array, said joint further comprising a guide ring on said seat and of a diameter smaller than that of said camming ring, said centers of said balls and said rings lying on the surface of a cone in the first axial position of said camming ring.

13. The joint defined in claim 12 wherein said shifting mechanism comprises pins extending at an acute angle to said seat and bearing upon said camming ring, a drive member in said seat engageable with said pins for displacing same to shift said camming ring from said one axial position to said other axial position, and a restoring member displaceable to shift said camming ring from said other axial position to said first axial position.

14. The joint defined in claim 13 wherein said seat has an end flange provided with apertures and said restoring member is a wheel having projections extending through said apertures and engageable with said camming ring.

* * * * *